United States Patent [19]

Brinkman

[11] 4,223,557
[45] Sep. 23, 1980

[54] FLOWMETER

[75] Inventor: John A. Brinkman, Agoura, Calif.

[73] Assignee: Rockwell International Corporation, El Segundo, Calif.

[21] Appl. No.: 23,810

[22] Filed: Mar. 26, 1979

[51] Int. Cl.³ .......................... G01F 1/22; G01F 1/36
[52] U.S. Cl. ................................................ 73/861.55
[58] Field of Search ................................... 73/207, 209

[56] References Cited
U.S. PATENT DOCUMENTS

| | | | |
|---|---|---|---|
| 1,965,333 | 7/1934 | Connell | 73/209 |
| 2,413,352 | 12/1946 | Hulsberg | 73/207 |

*Primary Examiner*—Herbert Goldstein
*Attorney, Agent, or Firm*—L. Lee Humphries; Craig O. Malin

[57] ABSTRACT

The flowmeter is basically a curved rotameter, having a tapered conduit which is curved in the vertical plane. Inlet and outlet plenum chambers are provided for passing the fluid through the curved rotameter. A ball is positioned within the curved rotameter so that it can move up the conduit under the influence of the stream of fluid. A differential pressure sensor (which may be mounted on a partition separating the plenum chambers) determines the pressure differential between both sides of the ball. This pressure differential is an indication of the rate of flow of fluid through the meter. In a preferred embodiment, two conduits with opposed curves are used to compensate for variations in vertical alignment of the flowmeter.

12 Claims, 6 Drawing Figures

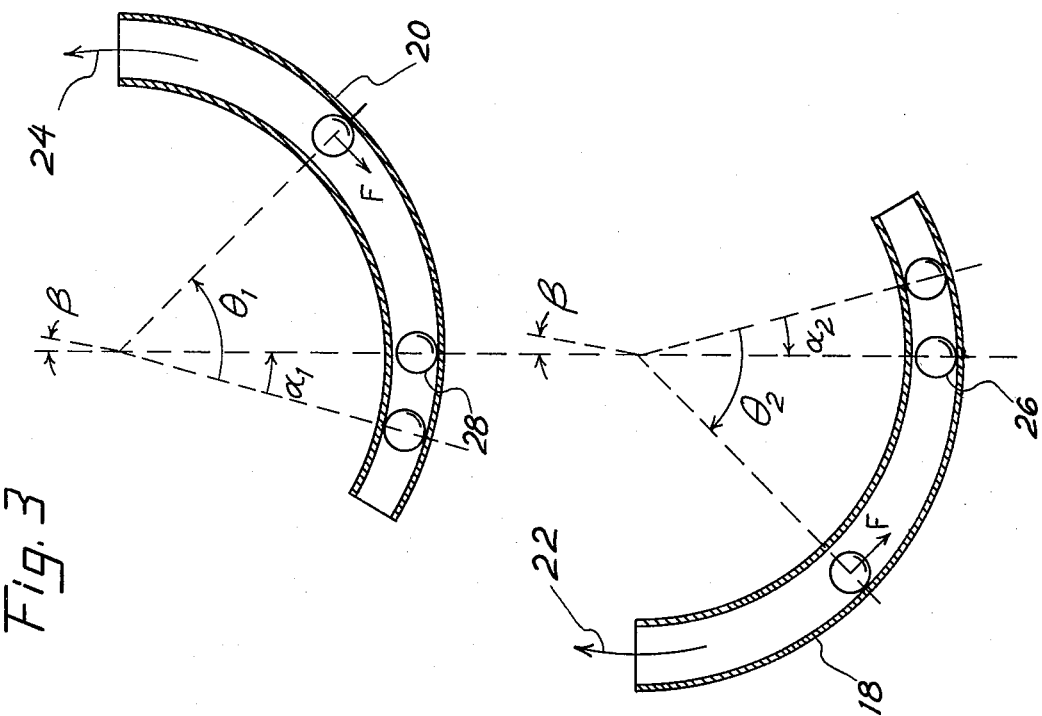
Fig. 3
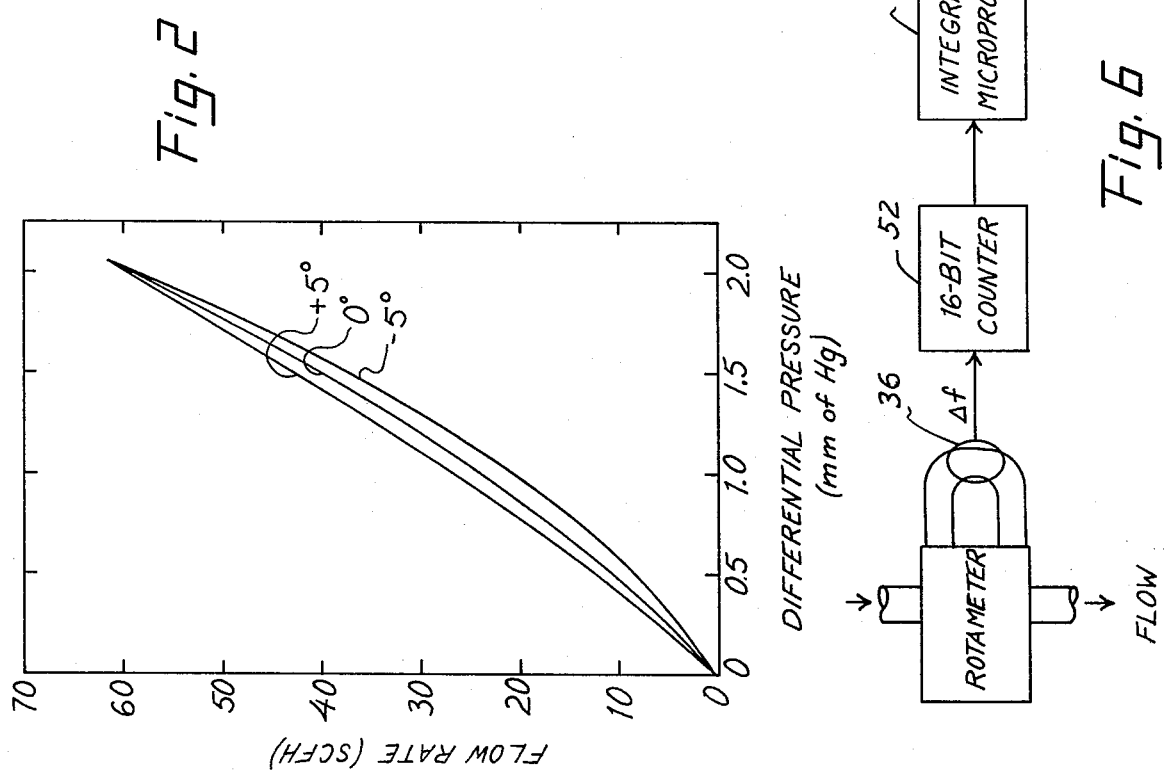
Fig. 2
Fig. 6

FLOWMETER

BACKGROUND OF THE INVENTION

1. Field of the Invention

This invention relates to the field of meters and particularly to the field of fluid flowmeters.

2. Description of the Prior Art

Gas flowmeters presently used to measure the consumption of natural gas are remarkably effective and reliable instruments. Nevertheless, improvements are desirable, particularly in view of rising demands for and cost of energy in all forms, including natural gas.

Gas meters for domestic use are generally of a mechanical type which utilize the displacement of a known volume by the flowing gas to determine the gas consumption. In such meters, an elastomeric bag can be filled and emptied or a chamber can be filled and emptied by a rotating mechanism or piston. Such prior art gas meters provide accurate measurements at flow rates ranging from less than 1.0 to more than 200 cfh and at pressure drops less than 0.05 psi during maximum flow. Actual accuracy is of the order of 0.5% over most of the flow rate range, dropping to serveral percent at the low flow rate end of the range. Improved accuracy is desirable over the entire range, particularly the low flow rate end.

Gas meters for other uses include types which determine flow rate by measuring the pressure drop across a fixed impedance (or orifice) and integrating this measurement over time. However, such orifice meters are not practical for measuring flow in applications such as domestic gas meters because the flow rates vary over wide limits. For example, in fixed-impedance turbulent flow type orifice meters, the pressure drop through the orifice is proportional to the square of the flow rate. A 0.5 to 200 cfh variation in residential flow rate (a factor of 400) would require a factor of $1.6 \times 10^5$ variation in the measurement of pressure differential. Such measurements cannot be made with suitable accuracy under domestic operating conditions.

When a porous plug is used in a fixed-orifice type meter to change the flow from turbulent to laminar, the pressure drop is proportional to the first power of the flow rate. This would make the pressure measurement less critical but raise the problem of orifice plugging by impurities in the gas stream.

Another class of flowmeter is known which utilizes a variable orifice. One such flowmeter (a rotameter) utilizes a tapered glass tube with a moving ball. In such meters, the position of the moveable member, rather than the pressure drop across the orifice, is used to indicate the flow rate. The flow rate is determined by the position of the ball within the glass tube as described in U.S. Pat. No. 2,778,223.

SUMMARY OF THE INVENTION

It is an object of the invention to provide a flowmeter which is useful and accurate over a wide range of flow rates.

It is an object of the invention to provide a flowmeter which utilizes a differential pressure measurement to determine flow rate.

It is an object of the invention to provide a flowmeter which has only a few moving parts.

It is an object of the invention to provide an improved gas meter for use in domestic, commercial, and industrial applications, as well as for use as a laboratory instrument.

According to the invention, the flowmeter has a tapered conduit, as does a conventional rotameter, the difference being that the conduit in the present invention is curved in the vertical plane. Inlet and outlet plenum chambers are provided for passing the fluid through the curved rotameter. A ball is positioned within the curved conduit so that it can move up the conduit under the influence of the stream of fluid. A differential pressure sensor (which may be mounted on a partition separating the plenum chambers) determines the pressure differential between both sides of the ball. This pressure differential is an indication of the rate of flow of fluid through the meter. In a preferred embodiment, two conduits with opposed curves are used to compensate for variations in vertical alignment of the flowmeter.

These and other objects and features of the present invention will be apparent from the following detailed description, taken with reference to the accompanying drawing(s).

BRIEF DESCRIPTION OF THE DRAWINGS

FIG. 2 are characteristic curves of flow rate vs differential pressure for the model shown in FIG. 1;

FIG. 3 is a sketch illustrating the geometrical principle of the invention;

FIG. 6 is a schematic of a flowmeter system.

DESCRIPTION OF THE PREFERRED EMBODIMENT

Figure 1:
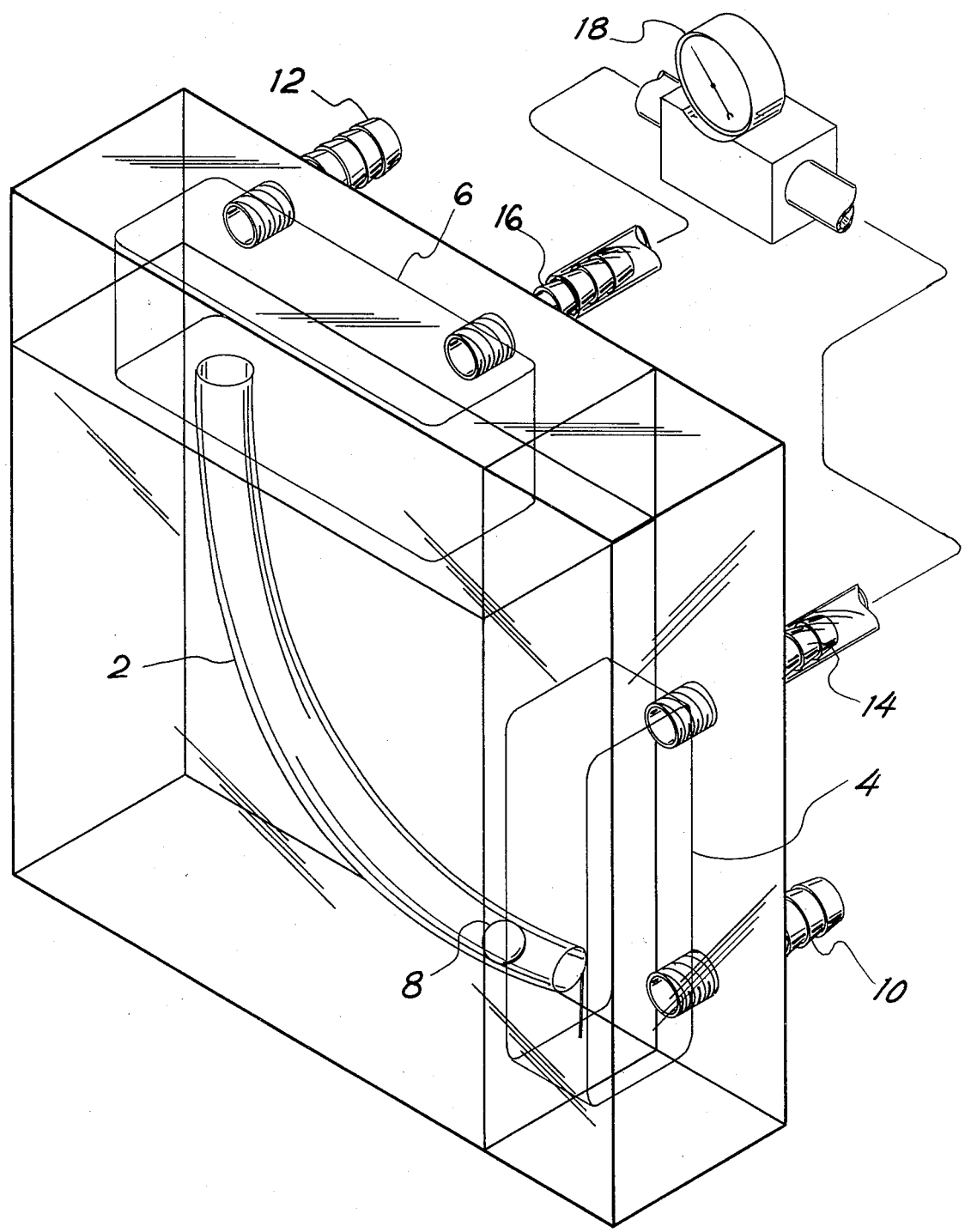
FIG. 1 is a perspective view of an experimental model used to evaluate the curved rotameter principle.

The transparent device shown in FIG. 1 illustrates the principle of operation of the flowmeter according to the present invention. Curved conduit 2 extends from an inlet plenum chamber 4 to exit plenum chamber 6. The gas whose flow is being measured enters chamber 4 through inlet 10 and leaves chamber 6 through exit 12. Additional ports 14, 16 are provided to measure the differential pressure between the inlet and outlet plenum chambers using differential pressure gauge 18.

A ball 8 is free to move within conduit 2 in response to the flow of gas through conduit 2. Curved conduit 2 is tapered so that its cross-sectional area increases from its inlet end to its outlet end. Therefore, a greater quantity of gas can flow past ball 8 when it is positioned near the outlet end rather than near the inlet end.

The centerline or axis of the conduit in which the ball resides is an arc of a circle 2.5 inches in radius, lying in a vertical plane. The conduit is uniformly tapered from a diameter of 0.375 inch at its intersection with the inlet plenum chamber, its diameter increasing at the uniform rate of 0.015 inch per inch of linear distance along its curved axis. The point of tangency of the conduit axis with a horizontal plane is 0.563 inch from the face of inlet plenum chamber 4.

This device was characterized by measuring the differential pressure between the inlet and outlet plenum chambers as a function of the flow rate of nitrogen gas through it. The ball was very stable under all flow rates except the very highest, when the ball began to exhibit random motion induced by the turbulent gas flow. The response time of the device was impressively fast in readjusting its geometry to a change in flow rate—generally well under a second.

Separate test were run with two different balls, each with a diameter of 0.375 inch. One ball was made of high density sintered alumina of density 3.82 gm/cm$^3$, and the other ball of steel of density 7.79 gm/cm$^3$. In tests using the alumina ball, differential pressure measurements were made first with the device vertically oriented as shown, next with the device rotated through an angle of +5° (counterclockwise) from the vertical orientation, and finally rotated through −5° (clockwise). The resulting flow rate vs Δp curves are shown in FIG. 2.

A curve was also obtained with the device in the vertical orientation using a steel ball rather than the alumina ball. The curve obtained is identical to the vertical orientation curve for an alumina ball, with two exceptions. The Δp numerical scale is increased by a factor of 2.04 (the ratio of the density of the steel ball to that of the alumina ball), and the flow rate numerical scale is increased by a factor of the square root of the same ratio.

FIG. 3 is a sketch illustrating the principle of operation of the flowmeter and the compensation obtained by using two opposed curved conduits 18, 20. Conduits 18, 20 are attached rigidly to each other either above each other as shown in FIG. 3 or in a side by side relation. To compensate for vertical misalignment of the flowmeter, the directions 22, 24 of the upward curve of each conduit must be counter to each other.

Since conduits 22, 24 are rigidly joined to each other:

$$\alpha_1 + \alpha_2 = \alpha.$$

To characterize the orientation of the assembled flowmeter relative to the vertical, angle $\beta$ is defined as:

$$\beta = \alpha_1 - \alpha_2/2,$$

where $\beta$ is the angle between the flowmeter symmetry axis and vertical. Clearly, for the two-tube device, $$A_T = A_1 + A_2,$$

where $A_T$ is the total annular area in both tubes and $A_1$, $A_2$ are the areas of annulus around the balls in conduit 18, 20; and $$V_T = V_1 + V_2,$$

where $V_T$ is the total volume rate of gas flow and $V_1$, $V_2$ are the volume rates of gas flow in conduits 18, 20. The tube taper is:

$$R_T = R_B + k\theta,$$

where $R_T$ is the radius of a conduit 18, 20 and $R_B$ is the radius of its ball 26, 28, k is a tube taper parameter, and $\theta$ is an angle denoting the position of the ball in a conduit, which gives:

$$A_i = 2\pi k R_B \theta_i + \pi k^2 \theta_i^2.$$

It then follows that, to the first non-vanishing terms in $\beta$, $$V_T = V_{T_0}\left(1 + \frac{k}{R_B} \frac{\beta^2}{\theta_{avg}}\right).$$

Here, $V_{T_0}$ denotes the value of $V_T$ when $\beta=0$, and $\theta_{avg}$ is the average of $\theta_1$ and $\theta_2$. Clearly, $\theta_{avg}$ will never be less than $\alpha_o/2$. Note that the error term varies with the square of $\beta$ for this symmetrical arrangement of two tubes. For a single curved tube flowmeter, vertical alignment is more critical because the error is proportional to the first power of $\beta$.

The pressure drop, Δp, on each ball 26, 28 acts on the cross-sectional area of the ball to generate a force in opposition to the gravitational force on the ball. The ball moves under the action of these two forces to an equilibrium position at which they are exactly equal:

$$F = mg\sin(\theta - \alpha) = \pi R_B^2 \Delta p.$$

where F is the component of gravitational force on the ball directed along the axis of the tube, g is the acceleration of gravity, and Δp is the pressure differential.

It should be pointed out at this point that there is an additional contribution to the pressure drop through the tube due to the impedance to the gas flow offered by the tube shape itself. Such a contribution can be made small and can be accounted for by calibration procedures.

The dependency of volume flow rate, V, on the pressure differential between the inlet and outlet plenum chambers cannot be readily calculated from the above formula because of the complex geometry, and because of the transition of flow from turbulent to laminar at the low flow rates. However, the experimentally determined curves in FIG. 2 can be used to relate volume flow rate to the pressure differential according to the following formula:

$$V = K(\Delta p)^{\frac{1}{2}} A_T,$$

where the value of constant K is selected to fit the empirically determined curve for the particular flowmeter design.

Figure 4:
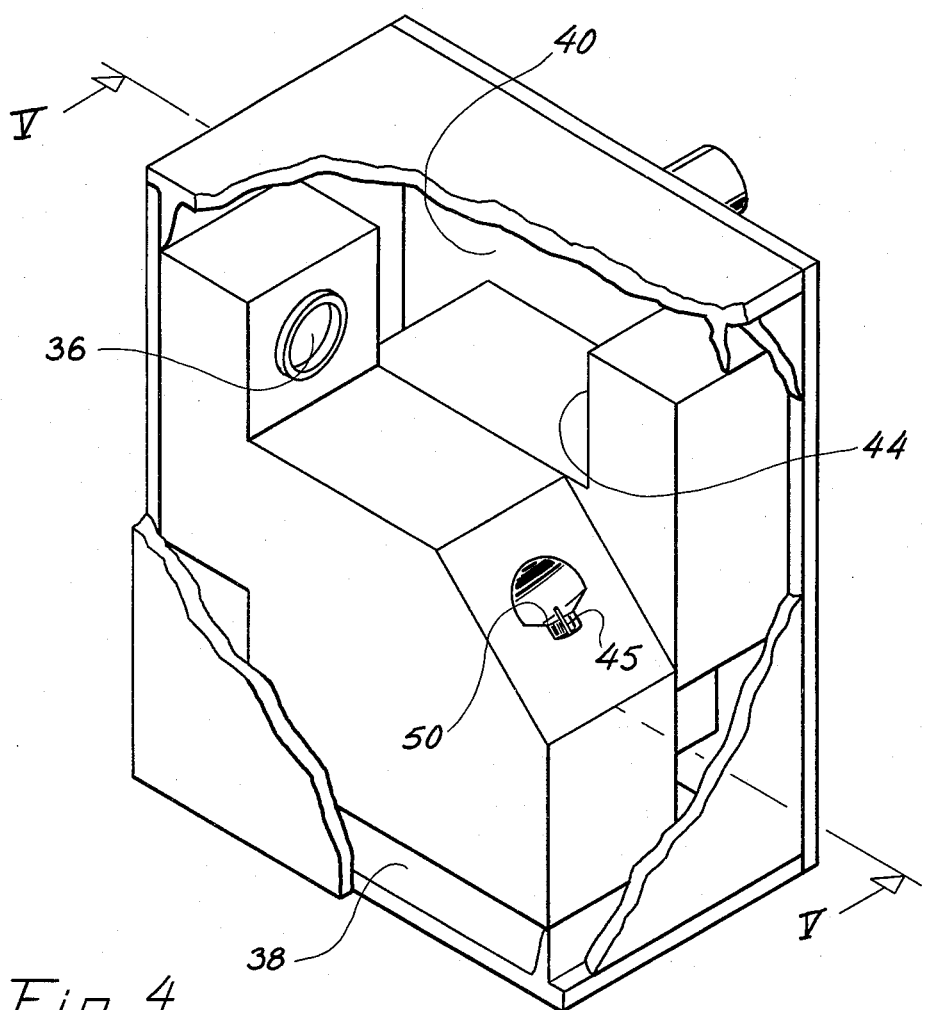
FIG. 4 is a perspective view of a flowmeter utilizing a compensating pair of curved rotameters.
Figure 5:
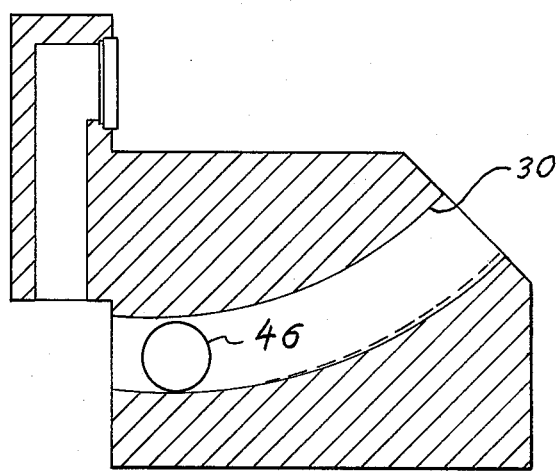
FIG. 5 is a cross-section taken at V—V in FIG. 4.

FIGS. 4 and 5 show a flowmeter designed to operate in the flow rate range of 0.5 to 250 SCFH of air, nitrogen, or natural gas. This meter contains two adjacent curved rotameter tubes 30 rotated 180° about a vertical axis with respect to each other. It incorporates a differential pressure sensor 36 in the partition between inlet chamber 38 and outlet chamber 40. The cross-sectional material (FIG. 5) defining the rotameter tubes forms the partition between the inlet and outlet chambers 38, 40. A temperature sensor 44 may be located in the partition to provide temperature compensation capability. Additionally, stop 45 can be provided at the conduits' ends to retain the ball within the conduit.

The two curved rotameter tubes 30 allow a maximum gas flow about 250 SCFH when 0.5 inch diameter alumina balls 46 are used and when the balls are in an angular position of 45°. The differential pressure between the inlet and outlet plenum chambers at this flow is about 0.038 psi. Lower differential pressure values can be achieved using lower density balls such as glass. However, it is important that the ball material be dimensionally stable and have good wear resistance.

Tracks 50 for the ball to roll on are provided in the curved rotameter tubes. These tracks keep the ball accurately in the center of the tube and reduce the rolling friction of the ball particularly for gases which tend to deposit a film along the bottom of the tube.

Satisfactory results have been obtained using curved rotameter tubes fabricated from tungsten deposited at elevated temperatures from a gas phase reaction onto a stainless steel mandrel. However, the tubes can be formed from any stable, wear-resistant, low-rolling-friction material.

Numerous differential pressure sensors ranging from mechanical gages to solid state electronic devices are available or under development to measure the differential pressure between the inlet and outlet plenum chambers. The curves shown in FIG. 2 were obtained using an MKS Baratron pressure meter. Pressure sensor 36 shown in FIG. 4 is an oscillator crystal type device whose frequency changes as a function of the bending pressure on the crystal. The frequency can be counted with a frequency counter 52 and the output from the counter stored or integrated in an integrating microprocessor 54 as shown in FIG. 6. The final output from the microprocessor is a binary code digital signal which can be read either by a digital display or bussed to other digital processing equipment.

Numerous variations and modifications can be made without departing from the present invention. In addition to its use in a domestic gas meter, the curved rotameter can be used in a dual-function laboratory instrument capable of providing digital readout of both flow rate and integrated gas flow, or in a commercial or industrial gas meter having the above dual-function capability plus a flow rate vs time recording capability. Additionally, the design could be modified to measure the flow of liquids. Accordingly, it should be clearly understood that the form of the present invention described above and shown in the accompanying drawings is illustrative only and is not intended to limit the scope of the present invention.

What is claimed is:

1. A meter for measuring the flow of a fluid comprising:
   a conduit having an inlet end and an outlet end and being curved so that said outlet end is higher than said inlet end, said conduit having a cross section which increases in area toward said outlet end;
   a mass positioned within said conduit and moveable along said conduit;
   means for passing a fluid through said conduit from said inlet end to said outlet end; and
   means for measuring pressure differential between the fluid on both sides of said mass, whereby flow of fluid through said conduit is measured.

2. The meter as claimed in claim 1, wherein said conduit is substantially circular in cross section.

3. The meter as claimed in claim 2, wherein said mass comprises a ball.

4. The meter as claimed in claim 3, wherein said conduit is tapered so that its inside diameter increases uniformly from said inlet end to said outlet end.

5. The meter as claimed in claim 1, wherein said conduit has a track for said mass to move along.

6. The meter as claimed in claim 1, wherein the axis of said conduit is an arc of a circle lying in a vertical plane.

7. The meter as claimed in claim 1, wherein said means for passing a fluid through said conduit comprises a housing having an inlet plenum chamber and an outlet plenum chamber separated by a partition, said conduit's inlet end being open to said inlet plenum chamber and outlet end being open to said outlet plenum chamber, said housing having openings for passing fluid being measured into said inlet plenum chamber, through said conduit to said outlet plenum chamber, and out of said outlet plenum chamber.

8. The meter as claimed in claim 7, wherein said means for measuring pressure differential is mounted on said partition so that one side of said means for measuring pressure differential is exposed to said inlet plenum chamber and another side is exposed to said outlet plenum chamber.

9. The meter as claimed in claim 7, including a temperature sensor mounted on said housing to provide a temperature indicating signal.

10. The meter as claimed in claim 1, including a second conduit and a second mass similar to said first-mentioned conduit and mass, said conduits being positioned so that the direction of their upward curves are counter to each other, and wherein said means for passing a fluid comprises means for passing a fluid through both said conduits, whereby compensation is provided for differences in positioning of said meter with respect to vertical.

11. The meter as claimed in claim 1, including stop means to prevent said mass from exiting said conduit.

12. A meter for measuring the flow of gas comprising:
    a housing having an inlet plenum chamber and an outlet plenum chamber separated by a partition;
    a pair of conduits, each of said conduits having an inlet end open to said inlet plenum chamber and an outlet end open to said outlet plenum chamber and being curved so that said outlet end is higher than said inlet end, each of said conduits having a substantially circular cross section which increases in area toward said outlet end, said conduits being positioned in said housing so that the direction of their upward curves are counter to each other, said housing having openings for passing gas being measured into said inlet plenum chamber through said conduit to said outlet plenum chamber and out of said outlet plenum chamber;
    a ball positioned within each of said conduits and moveable along said conduit in which it is positioned; and
    means coupled to said meter for measuring differential pressure between said inlet and outlet plenum chambers.

* * * * *